Patented July 6, 1937

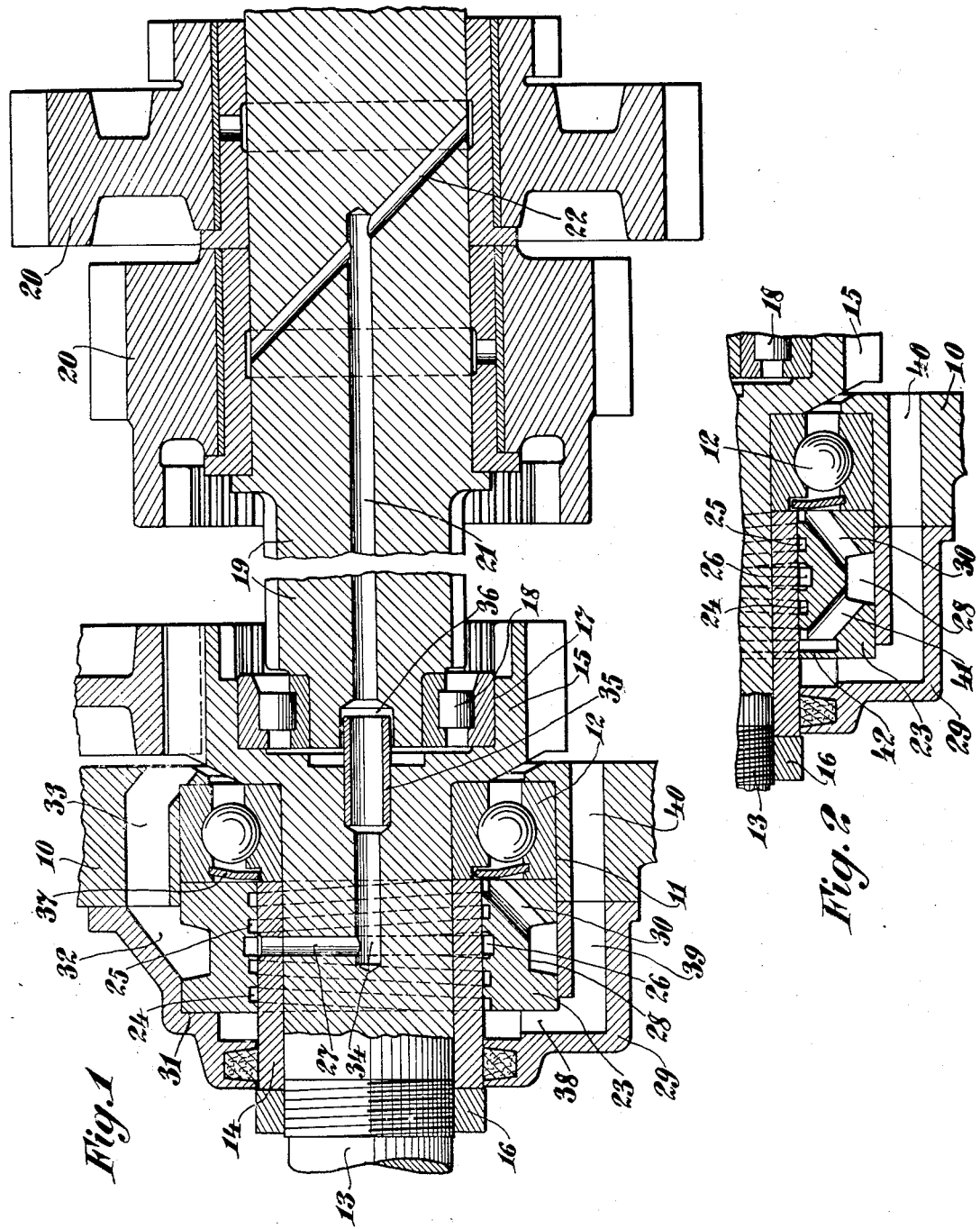

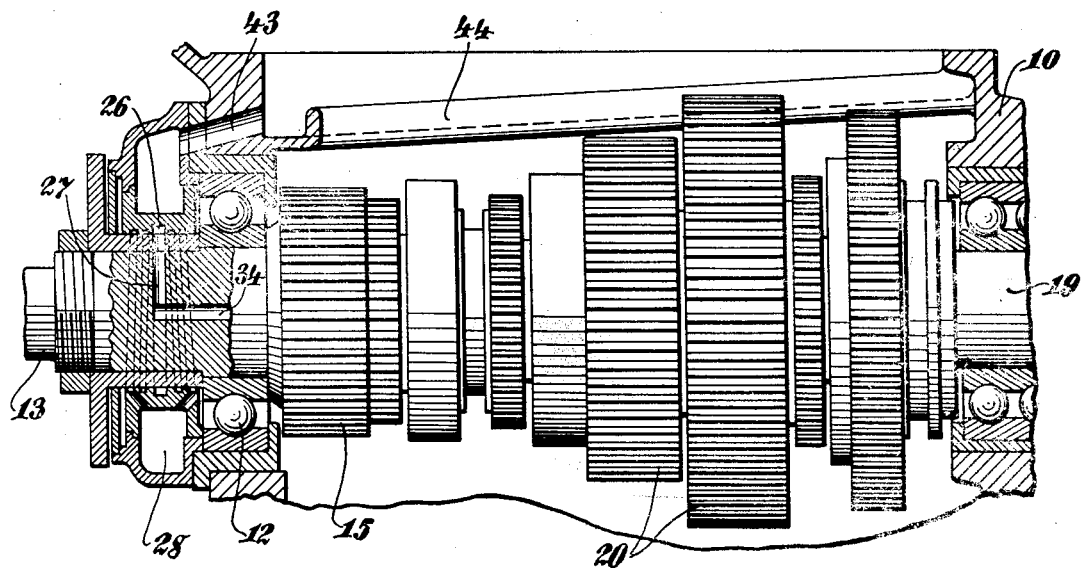

2,085,814

UNITED STATES PATENT OFFICE 2,085,814

LUBRICATION SYSTEM

Joseph L. Matthews and Aladar Kurti, New Brunswick, N. J., assignors to International Motor Company, New York, N. Y., a corporation of Delaware Application December 17, 1934, Serial No. 757,780

10 Claims. (Cl. 184—6)

The present invention relates to lubricating devices for bearings and other relatively movable surfaces and embodies, more specifically, a lubricating device and system by means of which relatively movable parts are utilized to direct the lubricant to remote bearings, the relatively movable parts also being utilized to prevent leakage from the system.

More particularly, the invention embodies an improved lubrication system wherein a pump is provided which not only serves to direct the lubricant effectively to remote parts under sufficient pressure but also serves as an effective seal between the relatively rotating members. In lubrication systems for vehicle transmission mechanisms and similar devices, the necessity arises for directing the lubricant under suitable pressure not only to remote interior bearings within the housing but to bearings of rotating shafts extending into or through the housing. Lubrication of these last named bearings must be effected without loss of lubricant and it is an object of the present invention to provide a lubrication system wherein a rotating member is utilized as a source of power for pumping the lubricant through the system, the elements constituting this pumping device including a means for preventing lubricant from escaping from the shaft bearing in the housing wall.

A further object of the invention is to provide a lubricating device of the above character wherein an improved means is provided for supplying oil to the pump mechanism.

A further object of the invention is to provide a lubrication system and pump mechanism by means of which the bearing retainer of a bearing in the transmission housing is utilized as a pump housing and cooperates with the lubricating elements to supply the lubricant effectively to the pump mechanism.

Further objects, not specifically enumerated above, will be apparent as the invention is described in greater detail in connection with the accompanying drawings, wherein:

Figure 1 is a view in section, taken on a plane passing through the axis of a bearing and shaft of a transmission mechanism and illustrating the pump mechanism of the present invention.

Figure 2 is a detail view in section, showing a modified form of pump mechanism.

Figure 3 is a detail view showing a further modification of the invention wherein oil is supplied to the pump in a modified manner.

Referring to the above drawings, a gear transmission housing is shown at 10 and is formed with a bearing recess 11 within which a bearing 12 is received. The housing 10, for the purposes hereof, may be considered as a relatively stationary member. A pinion shaft 13 is journaled in the bearing 12 and located by means of a cylindrical shaft spacer 14 and a pinion 15 which is formed on the shaft. A nut 16 may be threaded on the shaft 13 to position the spacer 14 properly.

Within the pinion 15, a recess 17 is formed within which a bearing 18 may be received to journal the end of a driven shaft 19. Shaft 19 may carry one or more gears 20 which may be journaled thereon, the bearings of such gears on the shaft 19 being lubricated by means of an axial bore 21 and radially extending bores 22.

In order that oil may be supplied under sufficient pressure to the remote bearings fed by ducts 22, a pumping mechanism is provided comprising a spool 23, the interior of which spool is formed with oppositely extending threads 24 and 25. The helical groove formed by the threads 24 and 25 communicates with a central annular chamber 26 formed in the spool 23 which, in turn, communicates with a radial duct 27, extending through the spacer 14 and into the shaft 13. The thread 25 progresses from the right hand end of the spool 23 to the central chamber 26, while the thread 24 progresses from the left hand end thereof to the chamber 26.

The exterior of the spool is formed with an annular groove 28 which, in cooperation with a bearing retainer 29, forms an annular chamber which communicates with the right hand end of thread 25 through a duct 30. The bearing retainer 29 is formed with a recess 31 within which the spool 23 is received, a duct 32 also being formed therein to communicate with a duct 33 formed in the transmission housing wall 10. Duct 33 terminates opposite the meshing point of the main drive gears including the pinion 15, and the oil that is picked up by the gears will be squirted out from between the teeth and thrown with some force into the duct 33, thus supplying oil to the duct 32 and chamber 28.

Duct 27 communicates with an axial duct 34 which supplies the lubricant to a bushing 35, received in an enlarged extremity 36 of the duct 21. In operation, it will be seen that oil will be picked up by the gears including the pinion 15 and thrown into the ducts 32 and 33, filling the chamber 28. From the chamber 28, the oil flows to the thread or groove 25 and comes into contact with the rotating cylindrical shaft spacer 14. Due to its capillary action or adhesion the oil is carried along the spiral groove or thread 25 toward the central groove 26 and a pressure will thus be created in the groove or chamber 26 which will force the lubricant through the ducts 27 and 34 and bushing 35. Sufficient clearance has been illustrated as being provided between the bushing 35 and the enlarged portion 36 of duct 21 in order that lubricant may escape into the bearing 18 from which it will fall into the transmission housing. Ducts 21 and 22 will thus receive the lubricant under sufficient pressure.

A baffle 37 is provided in the bearing 12 to prevent lubricant from flowing directly into the bearing from the duct 30 and leakage of oil from between the spool 23 and spacer 14 is prevented by the helical groove 24 which causes any leakage of oil from the chamber 26 thereinto to be forced back into the chamber 26. Any oil which escapes, however, would be caught in a chamber 38 and returned to the transmission housing through a duct 39 in the bearing retainer and duct 40 in the wall 10.

In the modification shown in Figure 2 both helical grooves 24 and 25 are utilized as a pumping means, these grooves being fed from the annular chamber 28 by means of duct 30 and an additional duct 41. A baffle 42 may be provided to prevent leakage of the oil from the spool 23.

In the modification shown in Figure 3, oil is supplied to the chamber 28 through a duct 43 which receives oil from a trough 44, formed in the transmission wall. Rotation of the gears splashes oil into the groove 44 and the oil then flows down into the duct 43 and chamber 28 in a manner which will be readily apparent.

It will thus be seen that a lubrication system has been provided wherein oil is effectively pumped to remote bearings by a pumping mechanism which is simple of construction and effective in operation and which does not increase the number of relatively rotating parts in the device to be lubricated. Moreover, the mechanism is of such character as to prevent, effectively, leakage of oil through the bearing in the transmission housing with which the pumping mechanism is associated, the retainer for such bearing coacting with the pumping mechanism to afford a convenient and effective housing for the pumping mechanism. It is to be noted that the lubrication system of the present invention directs the lubricant fluid through the axis of the rotating parts and supplies the fluid to the bearings through radially extending ducts, thus increasing the pressure at which the fluid is supplied to the bearings by the centrifugal action of the rotating part or parts.

While the invention has been described with specific reference to the accompanying drawings, it is not to be limited, save as defined in the appended claims.

We claim as our invention:

1. A lubricating system for transmission mechanisms having a rotatable shaft and a housing in which the shaft is journaled, an oil duct in the shaft, means carried by the housing in which a helical groove is formed, the duct communicating with the groove, and a trough in the housing communicating with the groove to supply lubricant thereto.

2. A lubricating system for transmission mechanisms having a rotatable shaft and a housing in which the shaft is journaled, an oil duct in the shaft, means carried by the housing in which a helical groove is formed, the duct communicating with the groove, a gear set connected to the shaft, and a duct in the housing opposite the meshing point of the gears communicating with the helical groove, whereby a lubricant will be projected into the duct in the housing from the gears.

3. A lubricating mechanism comprising a stationary member, a shaft having an oil duct formed therein and journaled in the stationary member, a spool carried by the stationary member about the shaft, the interior of the spool being formed with a helical groove communicating with the oil duct in the shaft, and the stationary member being formed with means to supply oil to the groove.

4. A lubricating mechanism comprising a stationary member, a shaft having an oil duct formed therein and journaled in the stationary member, a spool carried by the stationary member about the shaft, the interior of the spool being formed with a helical groove communicating with the oil duct in the shaft, and a second helical groove extending in the opposite direction from the last named groove, the duct communicating with both helical grooves, and a duct carried by the stationary member for supplying oil to one of the grooves.

5. A lubricating mechanism comprising a stationary member, a shaft having an oil duct formed therein and journaled in the stationary member, a spool carried by the stationary member about the shaft, the interior of the spool being formed with a helical groove communicating with the shaft, and a second helical groove extending in the opposite direction from the last named groove, the duct communicating with both helical grooves at the adjacent ends thereof, and a duct carried by the stationary member for supplying oil to the opposite ends of the helical grooves.

6. A lubricating system for transmission mechanisms having a rotatable shaft and a housing having a bearing in which the shaft is journaled, an oil duct in the shaft, a bearing retainer on the housing, a spool in the retainer about the shaft, the spool having a helical groove on the interior surface thereof communicating with the duct in the shaft, and means in the spool to supply oil to the groove.

7. A lubricating system for transmission mechanisms having a rotatable shaft and a housing having a bearing in which the shaft is journaled, an oil duct in the shaft, a bearing retainer on the housing, a spool in the retainer about the shaft, the spool having a helical groove on the interior surface thereof communicating with the duct in the shaft, the retainer being formed with a duct to return escaped oil from the groove to the housing, and means in the spool to supply oil to the groove.

8. A lubricating system for transmission mechanisms having a rotatable shaft and a housing having a bearing in which the shaft is journaled, an oil duct in the shaft, a bearing retainer on the housing, a spool in the retainer about the shaft, the spool having reversely leading helical grooves on the interior surface thereof communicating with the duct in the shaft at their adjacent ends, one of the said grooves lying adjacent the bearing, and means to supply oil to the groove adjacent the bearing at the end thereof distant from the other helical groove, whereby the said other helical groove will return oil tending to escape to the duct in the shaft.

9. A lubricating system for transmission mechanisms comprising a housing, a driving shaft journaled therein, a driven shaft coaxial to the driving shaft, the shaft having axial ducts formed therein, a bearing journalling the driven shaft in the driving shaft, a bushing in one of the shafts communicating with the duct formed therein, the duct in the other shaft being formed with an oversized recess to receive the bushing, whereby oil may escape to lubricate the last named bearing.

10. A lubricating mechanism comprising a stationary member, a shaft member having an oil duct formed therein and journaled in the stationary member, means carried by one of the said members and formed with a helical groove open to the other of the said members and communicating with the oil duct in the shaft, an extremity of the oil duct in the shaft extending to and being in direct communication with the helical groove, and means on the stationary member to supply oil to the groove.

JOSEPH L. MATTHEWS.
ALADAR KURTI.